Dec. 13, 1949 L. E. MEISNER 2,490,824
STOCK WATERING TROUGH
Filed May 9, 1944 2 Sheets-Sheet 1

Inventor
LEO E. MEISNER
By Kimmel & Crowell
Attorney

Dec. 13, 1949 — L. E. MEISNER — 2,490,824
STOCK WATERING TROUGH
Filed May 9, 1944 — 2 Sheets-Sheet 2
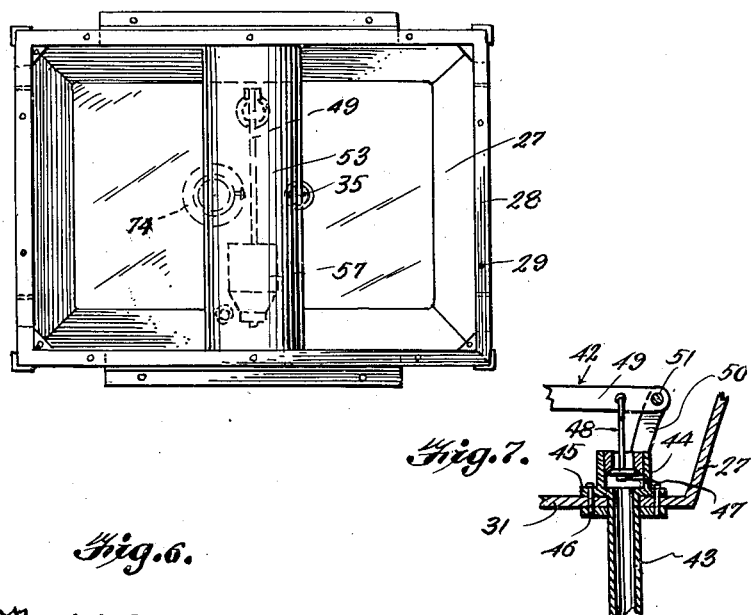
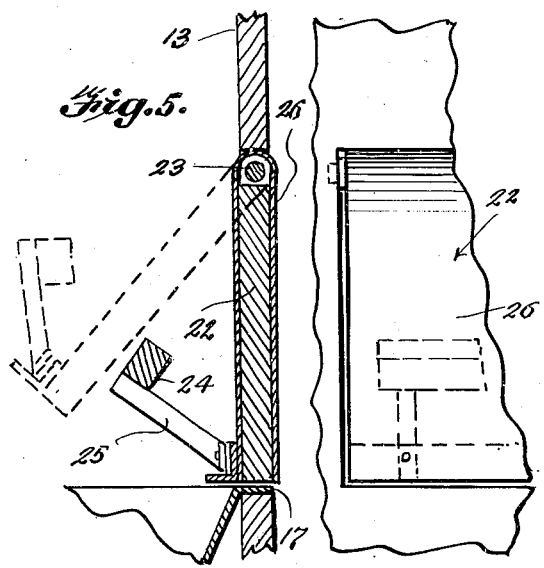
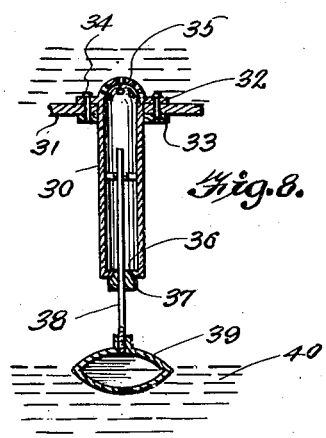
Inventor
LEO E. MEISNER Patented Dec. 13, 1949

2,490,824

UNITED STATES PATENT OFFICE 2,490,824

STOCK WATERING TROUGH

Leo E. Meisner, Raymond, Ill.

Application May 9, 1944, Serial No. 534,742

1 Claim. (Cl. 119—73)

This invention relates to watering devices for live stock.

An object of this invention is to provide a watering device in the form of a trough which is mounted in an insulated housing so that the water in cold weather will not freeze, and in warm weather will not become unduly heated.

Another object of this invention is to provide a watering device of this kind in the form of an automatically operable fountain which is adapted to automatically maintain a predetermined level of water in the trough.

Another object of this invention is to provide in a device of this kind means whereby the cold air from the outside will not affect to any great extent the warmer air within the trough housing.

A further object of this invention is to provide in a device of this kind means whereby the operating means for maintaining the trough at a predetermined level is guarded so that the animals will not be able to contact with the operating means.

A further object of this invention is to provide a watering trough embodied in an insulated housing, the latter being formed with gravity closing doors so as to normally maintain the housing in a closed condition.

A further object of this invention is to provide a trough of this kind which may be placed at any convenient point and secured to a suitable support if desired, the device also including means whereby the interior of the housing may be heated so that the water will not freeze during cold weather.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a detailed side elevation, partly broken away and in section, of a watering device constructed according to an embodiment of this invention.

Figure 4 is a plan view of the device with the hood or top removed.

Figure 5 is a fragmentary vertical section showing one of the doors or closures.

Figure 6 is a fragmentary side elevation of the housing with one of the doors or closures closed.

Figure 7 is a fragmentary vertical section of the float operated valve for the reservoir or supply tank, and Figure 8 is a fragmentary vertical section of the float operated valve for regulating the discharge of water from the reservoir to the trough.

Figure 1:
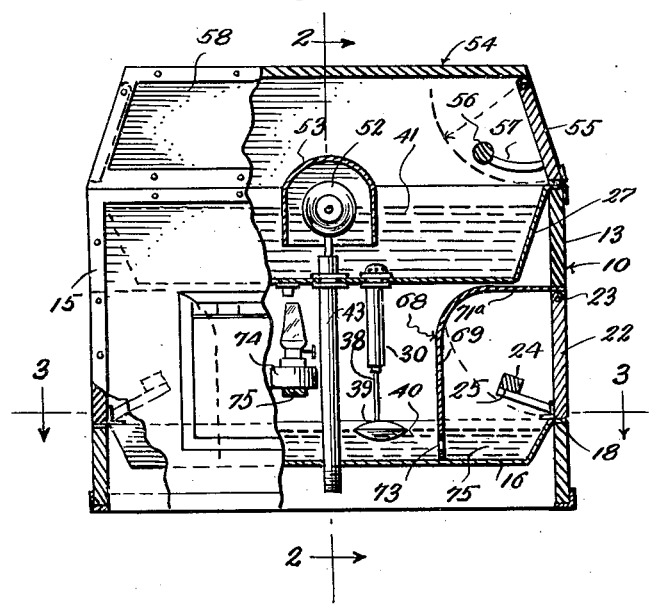

Referring to the drawings, the numeral 10 designates generally a housing which is formed of opposite side walls 11 and 12, and opposite end walls 13 and 14. The housing is rectangular in plan and preferably the side and end walls are formed of insulating material of suitable construction which may be inset in a reinforcing angle frame structure 15 secured to the vertical corners and the upper and lower edges of the housing.

The housing has mounted in the lower portion thereof a water trough 16 which extends between the opposite end walls 13 and 14, being provided with end flanges 17 secured to or resting on the lower marginal edge 18 of a pair of door openings 19 which are formed in the end walls 13 and 14.

The opposite longitudinal edges 20 of the trough 16 are spaced inwardly from the opposite side walls 11 and 12 so as to thereby provide an air space 21. The two door openings 19 are adapted to be closed by doors 22 of like construction which are pivotally mounted at the upper ends as at 23 in the upper portions of the openings 19. Each door or closure 22 is gravitatingly held in closed position by means of a weight 24 secured to inwardly projecting supporting arms 25 carried by the inner side of the door 22 adjacent the lower or free edge thereof.

The arms 25 project inwardly and upwardly as shown in Figures 1 and 5, and the weights 24 are of sufficient size to normally hold the doors 22 in closed position, but at the same time, an animal can push against the lower edge of a door and swing the same to an open position whereby the animal may drink from the trough 16. Each door 22 may be covered on the inner and outer sides thereof by a metal sheet or covering 26 which encompasses the insulation, and is bent about the upper edge of the door as shown more clearly in Figure 5.

The covering 26 provides a protecting means to protect the door against damage when the latter is pushed inwardly by the nose or head of the animal.

A water reservoir 27 is disposed within the housing 10 in the upper end thereof, being of a size substantially equal to the length and width of the housing 10, and is formed at the upper end thereof with marginal flanges 28 engaging over the upper edges of the housing 10 and secured thereto by fastening members 29. A discharge pipe 30 is secured to the bottom wall 31 of the reservoir 27, being secured to the bottom wall 31 by forming an annular flange 32 at the upper end of the pipe 30 and positioning a washer or annulus 33 below the bottom wall 31, the flange 32 and the annulus 33 being secured together by fastening members 34.

An apertured cap or dome 35 is carried by the upper end of the pipe 30, and projects into the lower portion of the reservoir 27. The lower end of the discharge pipe 30 terminates at a point above the trough 16 and is formed with a valve seat 36. An upwardly closing valve 37 carried by a vertically movable stem 38 is adapted to engage on the seat 36 so as to cut off the flow of water from the reservoir 27 when the trough 16 has been filled to a predetermined degree. A float 39 is secured to the lower end of the stem 38 and engages in the water 40 positioned in the trough so that when the level of the water 40 drops below a predetermined point, the valve 37 will move downwardly to an open position, and the water 41 in the reservoir 27 will gravitatingly flow downwardly through pipe 30 into the trough 16.

When the water 40 in the trough rises to a predetermined height, float 39 will move valve 37 to closed position and thereby cut off further discharge of water from the reservoir 27 to the trough.

The water 41 in the trough 27 is maintained at a predetermined level where the water supply is obtainable from an outside source as from an elevated tank or other supply under pressure, by means of a float operated valve structure, generally designated as 42. A delivery pipe 43 is secured to the bottom wall 31 of the reservoir 27 and extends downwardly at one side of the trough 16 in the air space 21. The pipe 43 is adapted to be extended either through the bottom of the housing 10 or may be extended through a side wall thereof for connection to the supply source.

The upper end of the delivery pipe 43 has secured thereto a valve seat 44 which is provided with a base flange 45 secured by fastening members 46 to the upper or inner side of the wall 31. A tappet valve member 47 which opens downwardly is adapted to engage against the seat 44 and has secured thereto a stem 48. The stem 48 extends upwardly and is pivotally secured to a float operated lever 49. The lever 49 is secured between a pair of upwardly projecting supporting arms 50 being mounted on a pivot 51 extending between the arms 50. The lever 49 has secured to the opposite end thereof a float 52 which, when the water 41 substantially fills the reservoir 27, is adapted to pull the valve 47 upwardly to cut off the reservoir from the delivery pipe 43.

A substantially U-shaped shield 53 is secured between the opposite longitudinal sides of the reservoir 27, being removable and encompassing the float valve structure 42 so that this structure will not be damaged when the housing is opened at the top.

A hood or cap 54 is mounted on the upper end of the housing 10 and normally closes the upper end of the housing, and extends upwardly from the reservoir 27. The hood 54 is formed of insulating material and is provided at the opposite ends thereof with gravity closed doors 55, normally maintained in a closed position by weights 56 carried by inwardly projecting arms 57. The arms 57 are secured to the lower portions of the doors 55 and will normally maintain these doors in closed position.

The opposite sides 58 of the hood 54 are vertical and the ends 59 extend upwardly and inwardly as shown in Figure 1.

Figure 2:
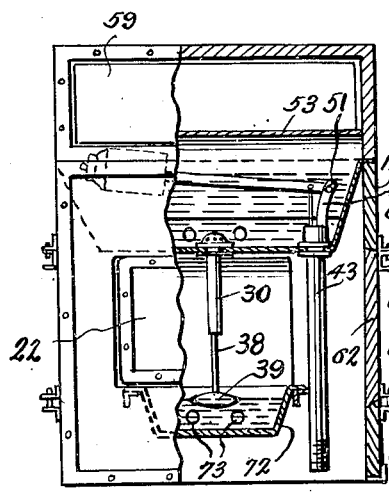
Figure 2 is a sectional view, partly in detail, taken on the line 2—2 of Figure 1.

The side walls 11 and 12 are provided with openings 60 and 61 respectively, which are closed by inwardly opening closures 62 and 63 respectively. The closures 62 and 63 are of like construction and are beveled at their upper and lower edges as shown in Figure 2, and are held in tightly closed position by securing pins 64 and 65 extending through complementary angle members 66 and 67 carried by the side walls and the closures 62 and 63.

The closures 62 and 63 are provided as inspection doors to permit access to the interior of the housing for necessary repairs and other work. By removing pins 64 and 65 the doors 62 and 63 may be dropped within the housing permitting access from outside. The doors 62 and 63 may then be secured back in place by pulling them into position from outside and reinserting the pins 64 and 65.

Figure 3:
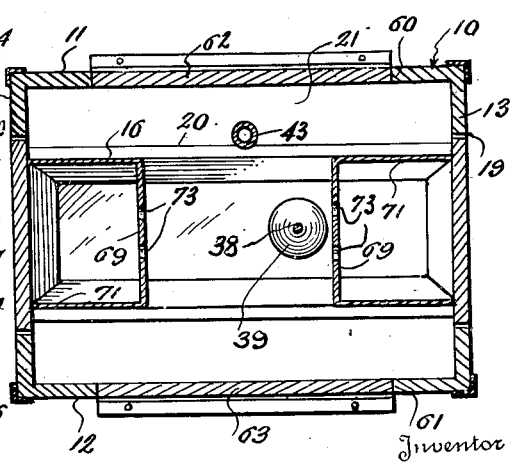
Figure 3 is a horizontal section taken on the line 3—3 of Figure 1.

In order to provide a means whereby the animals will not be able to contact with the float 39, and to prevent particles in the outer portions of the trough from floating inwardly toward the center, I have provided a pair of shields 68, which as shown in Figure 3 are U-shaped in horizontal section and which have one vertical side 69 thereof disposed in inwardly spaced relation to an end wall, thereby providing a watering chamber 70. The opposite sides 71 of each shield 68 extend forwardly and the top side 71a is horizontal and is secured to the adjacent end wall. Each shield 68 is formed with truncated V-shaped lower edge portions projecting into the downwardly and inwardly inclined side walls 72 of the trough 16, and the vertical leg 69 terminates snugly against the upper side of the bottom wall of the trough 16. The vertical side 69 is also provided with one or more openings 73 below the normal water level so that water may freely flow from the intermediate portion of the trough to the outer watering chamber 70. These shields 68 also provide a means whereby, when the watering doors are opened, the cold air from the outside will be prevented from contacting with the central portion of the interior of the housing.

In cold weather, the interior of the housing 10 may be maintained at a temperature above freezing by means of a heater 74 mounted on a support 75 positioned above the trough 16 and between the two shields 68. The heater 74 may be in the form of a lamp or other convenient heating arrangement.

In the use and operation of this watering device, the delivery pipe 43 is connected to a suitable source of water supply, and when the reservoir 27 has been filled, valve 47 will be moved upwardly to a closed position by the float 52. The animal desiring water will move one of the watering doors 22 inwardly against the pressure of the weight 24, and may drink water from the watering chamber 70. When the water in the trough 16 has been lowered to a predetermined point, float 39 will move valve 37 to an open position, thereby permitting the gravity discharge of water from the reservoir 27 through discharge pipe 30 into the central portion of the trough 16.

The smaller animals, such as dogs, will push in either closure 22, whereas cattle or horses will push in closure 55. The doors or closures 22 and 55 can be readily detached to provide free access to the water, and hood 54 can also be removed to provide free access to the upper trough or reservoir 27.

The side and end walls of tank 27 and end walls of trough 16 extend inwardly at bottom away from insulating wall to allow free circulation of air between tank and outside wall. The foun- of air about delivery pipe to prevent it from freezing.

The material of which the insulating wall is formed has water resistant coating to prevent deterioration from moisture and to maintain insulating value. An opening is provided in floor of tank 27 to allow connecting with pipe or hose to outside tank or trough at same level as tank to provide additional watering space for a larger number of animals that come to drink at one time in hot weather. This auxiliary connection may be disconnected in freezing weather.

What is claimed is:

A watering trough comprising a housing having insulated walls, a lower elongated trough in said housing, the opposite ends of said trough engaging the adjacent housing end walls for supporting said trough thereon, the side edges of said trough being spaced inwardly from the side walls of said housing to allow free circulation of air about said trough, an upper trough in said housing spaced upwardly relative to said lower trough and constituting a reservoir therefor, openings formed in said end walls above said lower trough, closures swingably carried by said end walls for closing each of said openings, means on each of said closures for gravitatingly urging said closures to closed position, a shield member disposed inwardly of each of said openings, each of said shield members including an inner wall having a plurality of openings adjacent the bottom edge thereof, a top wall engaging the adjacent end wall at the top of the related opening, and a pair of side members engaging said adjacent end wall at the opposite side edges of said related opening, the bottom edges of said inner wall and side members engaging said lower trough, and heating means disposed in said housing between said upper and lower troughs and said inner walls whereby when said closures are open said inner walls will prevent the escape of the warm air circulating in said housing.

LEO E. MEISNER.

REFERENCES CITED

The following references are of record in the file of this patent:

UNITED STATES PATENTS

| Number | Name | Date |
|--------|------|------|
| 232,077 | Shaw et al. | Sept. 7, 1880 |
| 707,530 | Wright | Aug. 19, 1902 |
| 822,440 | Falk | June 5, 1906 |
| 838,246 | Falk | Dec. 11, 1906 |
| 925,984 | Bernard | June 22, 1909 |
| 976,874 | Hasman | Nov. 29, 1910 |
| 1,130,662 | Bernard | Mar. 2, 1915 |
| 1,343,093 | Shoultz | June 8, 1920 |
| 1,346,307 | Eaton | July 13, 1920 |
| 1,375,039 | Eaton | Apr. 19, 1921 |
| 1,507,159 | Cosford | Sept. 2, 1924 |
| 1,541,471 | Black | June 9, 1925 |
| 1,548,720 | Lewis | Aug. 4, 1925 |
| 1,560,088 | Marquardt | Nov. 3, 1925 |
| 1,575,796 | Scheihing | Mar. 9, 1926 |
| 1,640,292 | Petrick | Aug. 23, 1927 |
| 1,644,660 | Arkfeld | Oct. 11, 1927 |
| 1,650,489 | Brechtbill | Nov. 22, 1927 |
| 1,782,075 | Ruskamp | Nov. 18, 1930 |
| 1,786,049 | Zoeller | Dec. 23, 1930 |